United States Patent [19]

Fuhrman et al.

[11] 3,894,751

[45] July 15, 1975

[54] BICYCLE WITH RETAINING CLIP FOR FRONT WHEEL

[75] Inventors: Delmar L. Fuhrman, Kettering; David L. Zachert, New Lebanon, both of Ohio

[73] Assignee: The Huffman Manufacturing Company, Miamisburg, Ohio

[22] Filed: Mar. 18, 1974

[21] Appl. No.: 451,968

[52] U.S. Cl. .................................. 280/279; 151/35
[51] Int. Cl. ............................................. B62k 25/00
[58] Field of Search ........... 280/279, 276, 289, 287; 85/50; 151/35, 41.75; 301/132, 1

[56] References Cited
UNITED STATES PATENTS

| | | | |
|---|---|---|---|
| 308,562 | 11/1884 | Jordan | 151/35 |
| 624,442 | 5/1899 | Baker | 280/279 |
| 2,707,012 | 4/1955 | Cox | 151/35 |
| 2,908,311 | 10/1959 | Garman | 151/41.75 |
| 3,217,772 | 11/1965 | Adams | 151/41.75 |
| 3,507,516 | 4/1970 | Fritz | 280/279 |
| 3,610,659 | 10/1971 | Gerarde | 280/279 |
| 3,807,761 | 4/1974 | Brilando et al. | 280/279 |

*Primary Examiner*—Kenneth H. Betts
*Assistant Examiner*—Jack D. Rubenstein
*Attorney, Agent, or Firm*—Biebel, French & Bugg

[57] ABSTRACT

A bicycle in which inadvertent separation of the front wheel from the slotted legs of the fork thereof is prevented by means of retaining clips each having an enlarged head received within an aperture formed in each of the legs adjacent to and above the slots in the legs and a depending body portion which overlies the slots in the legs and has openings therethrough which hold the ends of the front wheel axle captive within the fork slots even though the nuts threaded on the ends of the axle become loosened.

2 Claims, 7 Drawing Figures

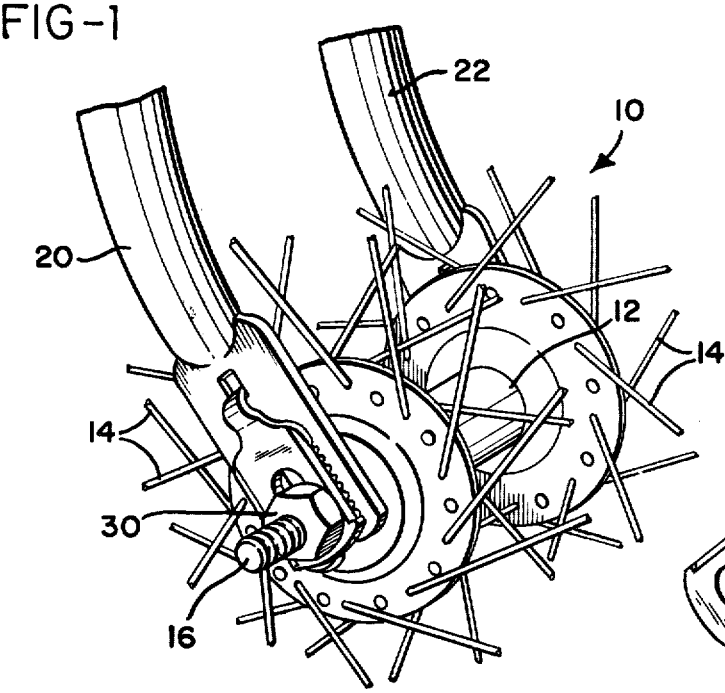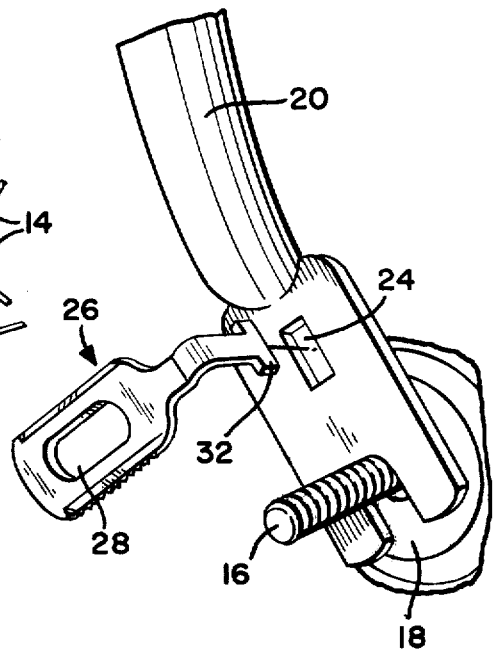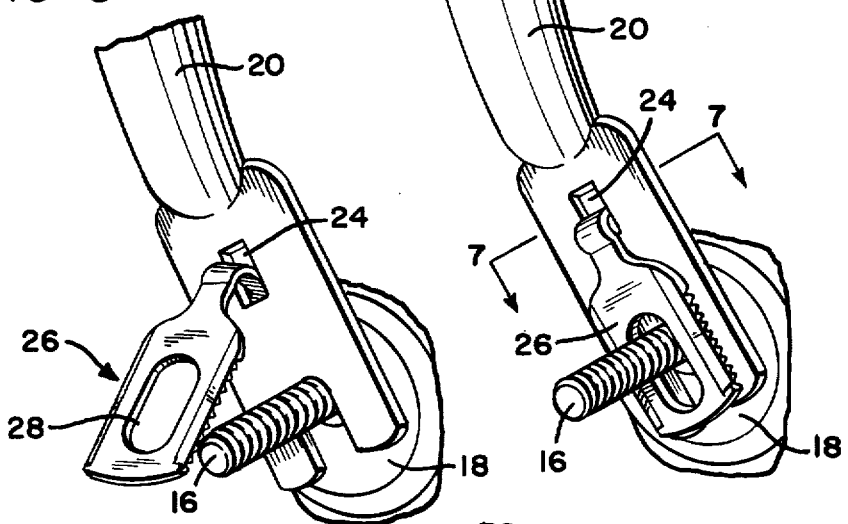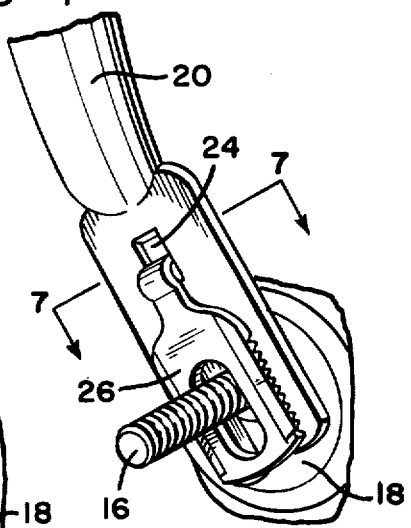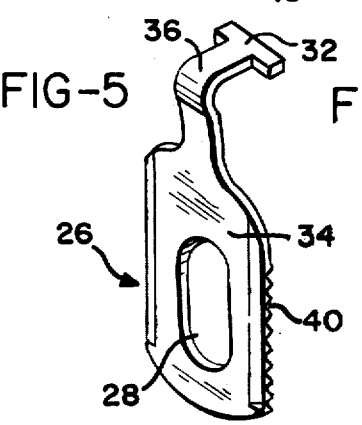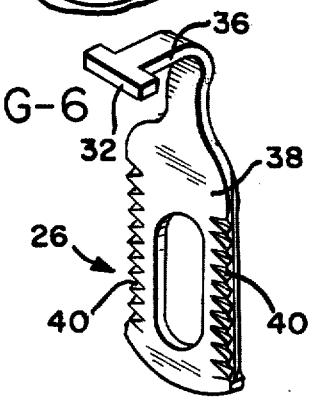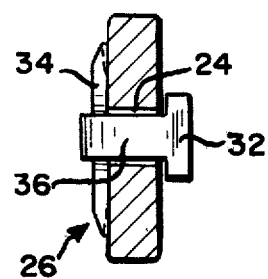

BICYCLE WITH RETAINING CLIP FOR FRONT WHEEL

BACKGROUND OF THE INVENTION

In bicycles of conventional construction the front wheel of the bicycle is usually mounted on the front fork with the threaded ends of the axle received in slots formed in the lower ends of the legs of the fork. This facilitates removal of the front wheel for routine maintenance and tire repair, since the ends of the front wheel axle may be simply slipped out of the slotted ends of the legs rather than requiring that the legs be sprung out, as would be the case if the legs were provided with openings rather than slots.

In this construction the treaded ends of the front wheel axle are retained in the slots in the fork legs only by the clamping force exerted by nuts threaded onto the axle. Obviously if the nuts become loosened, the portions of the axle received in the slots in the legs can separate from the bicycle fork, quite possibly causing injury to the rider and damage to the bicycle.

In recognition of this problem several solutions have been proposed to lessen the possibility of accidental separation of the front wheel from the bicycle frame. For example, the early U.S. Pat. No. 624,442 discloses so called "confining-plates" each of which has an opening therethrough overlying the slots in the legs of the fork and receiving the front wheel axle, and pins adapted to enter apertures in the fork legs.

In a similar vein are U.S. Pat. Nos. 963,993; 1,090,381; 3,507,516; and 3,610,659. Each of these patents, similarly to U.S. Pat. No. 624,442, provide various plates, bushings or other brackets which overlie the slotted lower ends of the fork legs to decrease the possibility of accidental separation of the front wheel from the bicycle frame.

While all of the constructions described in the above noted patents would appear to function to some extent to lessen the possibility of accidental separation of a bicycle front wheel from the bicycle frame, some of them require specially shaped openings in the fork legs and, more importantly, in each of them it would appear that if the nuts threaded on the outer ends of the axle become sufficiently loosened, the front wheel may still separate from the fork.

SUMMARY OF THE INVENTION

In accordance with the present invention a bicycle is provided with retaining clips which are attached to the legs of the bicycle fork and have openings therethrough overlying the slots in the lower ends of the fork legs to receive the threaded outer ends of the front wheel axle. The clips are provided with enlarged heads which are received in elongated apertures running lengthwise of the fork legs and the heads of the clips are held captive in the apertures by virtue of the relative size and shape of the apertures and the heads of the retaining clips.

The enlarged heads of the retaining clips may be T-shaped and connected to the body portions of the retaining clips by neck portions extending substantially normally to the body portion. The clips are attached to the forks by aligning the T-shaped heads of the clips with the elongated apertures, inserting the heads of the clips in the apertures, rotating the clips approximately 90°, and then pivoting the clips inwardly to receive the threaded ends of the front wheel axle in the openings in the bodies of the clips.

It will be seen that this construction provides a unique cooperation between the ends of the front wheel axle, the slotted ends of the fork and the wheel retaining clips. Thus, because the ends of the axle are received in both the openings in the clips as well as the slots in the ends of the fork legs, the wheel will not become separated from the fork even if the nuts received on the axle ends are loosened. At the same time the clips themselves, cannot become disengaged from the fork because they must be rotated to disengage their enlarged heads from the apertures in which they are received and they are prevented from rotating by virtue of the fact that the ends of the axle are received in the clip openings and the slotted lower ends of the fork.

Therefore, even though there is considerable loosening of the nuts on the front wheel axle, to the extent that in prior art structures the plates, bushings or other brackets would become disengaged from the legs of the fork, the clips of the present invention remain in engagement with the legs of the fork and prevent disengagement of the front wheel axle from the bicycle frame.

BRIEF DESCRIPTION OF THE DRAWINGS

FIG. 1 is a perspective view illustrating the present invention;

FIGS. 2 through 4 are perspective views showing a series of steps followed in attaching the clip of the present invention to the fork leg of a bicycle;

FIGS. 5 and 6 are perspective views of the retaining clip of the present invention; and FIG. 7 is a cross sectional view taken on line 7—7 of FIG. 4.

DESCRIPTION OF THE PREFERRED EMBODIMENT

As seen in FIGS. 1 through 4 of the drawings, a bicycle wheel 10 having a hub portion 12, a series of spokes 14 and an axle, one threaded end of which is shown at 16, is received in open ended slots 18 formed in the lower ends of the legs 20 and 22 of the fork of a bicycle. While only one end of the front wheel axle is shown, it will be obvious that the opposite end also includes a threaded, outwardly projecting portion received in the leg 22.

An elongated aperture 24 is formed in at least one of the fork legs, although preferably in both, just above the slot 18. A retaining clip 26 is provided with an opening 28 therethrough which may be aligned with the slot 18 to receive the threaded ends 16 of the front wheel axle and prevent inadvertent displacement of the axle from the fork if the nut or other fastening member 30 becomes loosened.

As probably best seen in FIGS. 5 and 6 of the drawings, the retaining clip 26 includes an enlarged head 32 joined to a body portion 34 by an offset neck portion 36. The neck 36 thus serves to offset the cross bar of the T-shaped head portion 32 from the body portion 34. It will also be seen, particularly in FIG. 6 of the drawings, that the inner face 38 of the body portion is provided with serrations 40 along each edge thereof to provide improved gripping contact with the outer surface of the fork leg with which it is associated.

As seen in FIG. 2 of the drawings, the retaining clip 26 is attached to a bicycle fork leg by first aligning the cross bar of the T-shaped head 32 with the slot 24. Then the T-shaped head 32 is moved through the slot 24 and rotated approximately 90° to the position shown in FIG. 3 of the drawings.

With the threaded end 16 of the front wheel axle received in the slot 18 in the fork leg the clip 26 is then pivoted inwardly to the position shown in FIG. 4 of the drawings to receive the threaded end 16 in the opening 28 in the clip. A nut or other fastener 30 is then threaded onto the threaded end 16.

With the clip in the position shown in FIGS. 1 and 4 of the drawings, it will be noted from FIG. 7 that the T-shaped head 32 of the clip extends at substantially right angles to the elongated aperture 24 in the fork leg and will engage the edges of the aperture 24. As a result, even if the fastener 30 should become loosened or even disengaged from the threaded end 16, the enlarged head 32 of the retaining clip will lock the clip to the fork leg and the closed peripheral opening 28 in the clip will retain the threaded end 16 of the front wheel axle in the fork legs.

This advantageous construction results from the unique cooperation of the elements involved. Thus, the threaded ends 16 of the front wheel axle cannot be displaced inadvertently from the slots 18 if the nuts 30 become loosened because the ends 16 are held in place by virtue of the fact that they are received in the openings 28 in the clips.

On the other hand, the clips cannot be disengaged from the legs of the fork because the T-shaped head 32 received in the aperture 24 requires that the clip be rotated from the position shown in FIG. 4 to that shown in FIG. 2 in order to become disengaged, and rotation of the clip is prevented by virtue of the fact that the ends 16 of the front wheel axle are received in both the openings 28 and the slots 18 in the fork.

Thus, unlike prior art plates, bushings and other brackets designed to prevent inadvertent disengagement of the front wheel from the fork thereof, not only is the front wheel prevented from becoming disengaged from the fork by the retaining clips, but the retaining clips are prevented from becoming disengaged by the front wheel and the fork. The present invention, therefore, functions even though the nuts or other retaining members are loosened to a great extent and may even continue to function even though there is a complete disengagement of the nuts or other retaining members from the front wheel axle.

While the form of apparatus herein described constitutes a preferred embodiment of the invention, it is to be understood that the invention is not limited to this precise form of apparatus, and that changes may be made therein without departing from the scope of the invention.

What is claimed is:

1. A bicycle including a front fork having a pair of depending legs, means defining an open ended slot in each of said legs extending upwardly from lower ends thereof, means defining an elongated aperture of rectangular configuration in each of said legs adjacent to and above the slots formed therein and extending lengthwise of the legs, a pair of retaining clips each including an enlarged head of substantially T-shaped configuration, a substantially planar body portion extending at substantially right angles to said T-shaped head, and a neck portion extending normally from said body portion and interconnecting said enlarged head and said body portion, said enlarged heads being received through said apertures and engaging edge portions of said legs defining said slots to retain said heads therein, said body portions overlying the slots of the legs with which they are associated, said T-shaped heads being of greater lengths than the widths of said apertures and of lesser lengths than the lengths of said apertures, whereby said clips must be rotated approximately 90° from their positions with said body portions overlying said apertures to disengage said T-shaped heads from said apertures, means defining elongated openings through said body portions extending coextensively with a portion of said slots in said legs, a front wheel having an axle, outer ends of said axle being threaded and received within said slots in said legs and said openings in said clips and thereby preventing rotation of said clips with respect to said legs and consequent disengagement of said heads from said apertures, and nuts threaded onto said threaded outer ends of said axles and securing said axle within both said slots in said legs and said openings in said clips.

2. The bicycle of claim 1 wherein said clip is provided with serrations along an inner face thereof in engagement with an outer surface of the leg with which it is associated.

* * * * *